US012596617B2

(12) United States Patent
Madan et al.

(10) Patent No.: US 12,596,617 B2
(45) Date of Patent: Apr. 7, 2026

(54) MAINTAINING FASTCOPY-OVERWRITE OPTIMIZATION USING KEY-VALUE PAIR FILE HANDLES FOR BACKUPS CLONED ACROSS NAMESPACES

(71) Applicant: Dell Products L.P., Round Rock, TX (US)

(72) Inventors: Nitin Madan, Cupertino, CA (US); Sanjay Vedanthan, Santa Clara, CA (US); Srisailendra Yallapragada, Cupertino, CA (US); Bhimsen Bhanjois, Fremont, CA (US); Neerajkumar Chourasia, San Ramon, CA (US); Alok Katiyar, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/497,289

(22) Filed: Oct. 30, 2023

(65) Prior Publication Data

US 2025/0138950 A1     May 1, 2025

(51) Int. Cl.
*G06F 17/00* (2019.01)
*G06F 11/1446* (2026.01)

(52) U.S. Cl.
CPC ...... *G06F 11/1453* (2013.01); *G06F 2201/80* (2013.01)

(58) Field of Classification Search
CPC ... G06F 11/1453; G06F 2201/80; G06F 16/14
See application file for complete search history.

(56) References Cited

U.S. PATENT DOCUMENTS

| | | | | |
|---|---|---|---|---|
| 10,416,922 | B1 * | 9/2019 | Rangapuram | ....... G06F 11/1451 |
| 11,226,865 | B2 * | 1/2022 | Wong | .................. G06F 16/1748 |
| 12,026,066 | B2 * | 7/2024 | Sagiraju | ............... G06F 3/0604 |
| 12,105,594 | B2 * | 10/2024 | Madan | ................. G06F 11/1453 |
| 2006/0271598 | A1 * | 11/2006 | Wong | .................... G06F 16/119 |
| 2021/0357293 | A1 * | 11/2021 | Mathew | ............... G06F 16/215 |
| 2022/0382642 | A1 * | 12/2022 | Bhanjois | ............. G06F 11/1451 |

* cited by examiner

*Primary Examiner* — Greta L Robinson
(74) *Attorney, Agent, or Firm* — Staniford Tomita LLP

(57) ABSTRACT

Enhancing data replication performance by preserving fast-copy-overwrite optimization for backups cloned across namespace subdivisions in a deduplication filesystem. A process keeps a key value pair for each of the files that are being cloned from the original namespace to a subcopy namespace. The key is the file handle of the file being cloned in the original namespace and the value is the handle of the cloned file in the subcopy namespace. When a subsequent generation backup of the same asset is cloned the basefile target file relationship is transferred as is to the new file in the subcopy namespace. This maintains the basefile to target file relationship after cloning to realize fastcopy-overwrite optimization benefits for the backup to the subcopy namespace.

20 Claims, 8 Drawing Sheets

100

100

STORAGE/BACKUP
MANAGEMENT
PROCESS
112

Fastcopy/Clone
Process
111

Fastcopy Overwrite
Optimization
Preservation
120

102
Storage
Server

124

NETWORK STORAGE
114

NETWORK
110

104

VM STORAGE

108

DATA SOURCE

DATABASE
PROCESSES
116

106
DB
Server

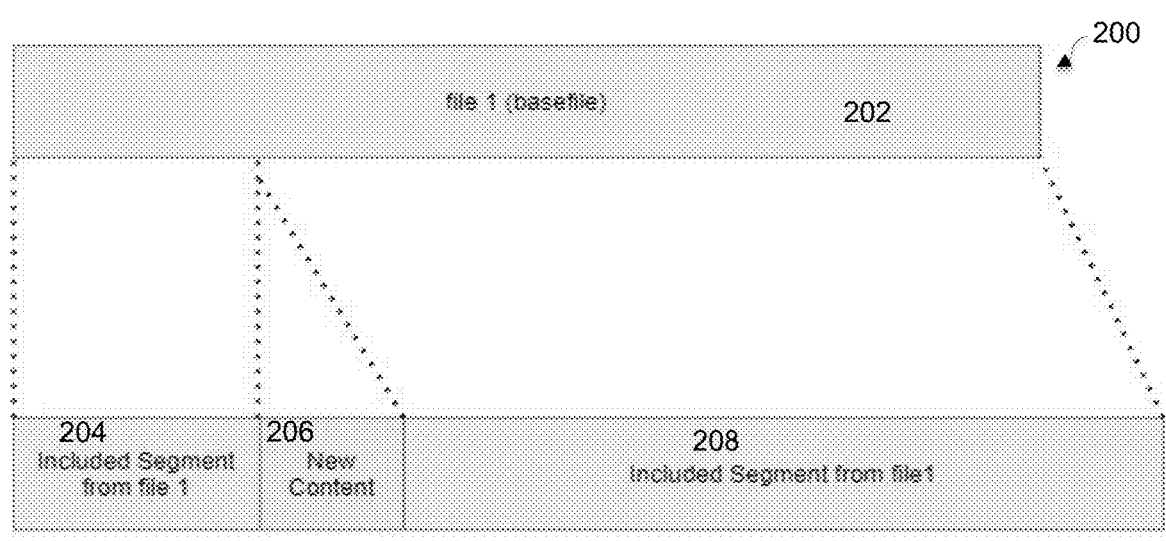
FIG. 2
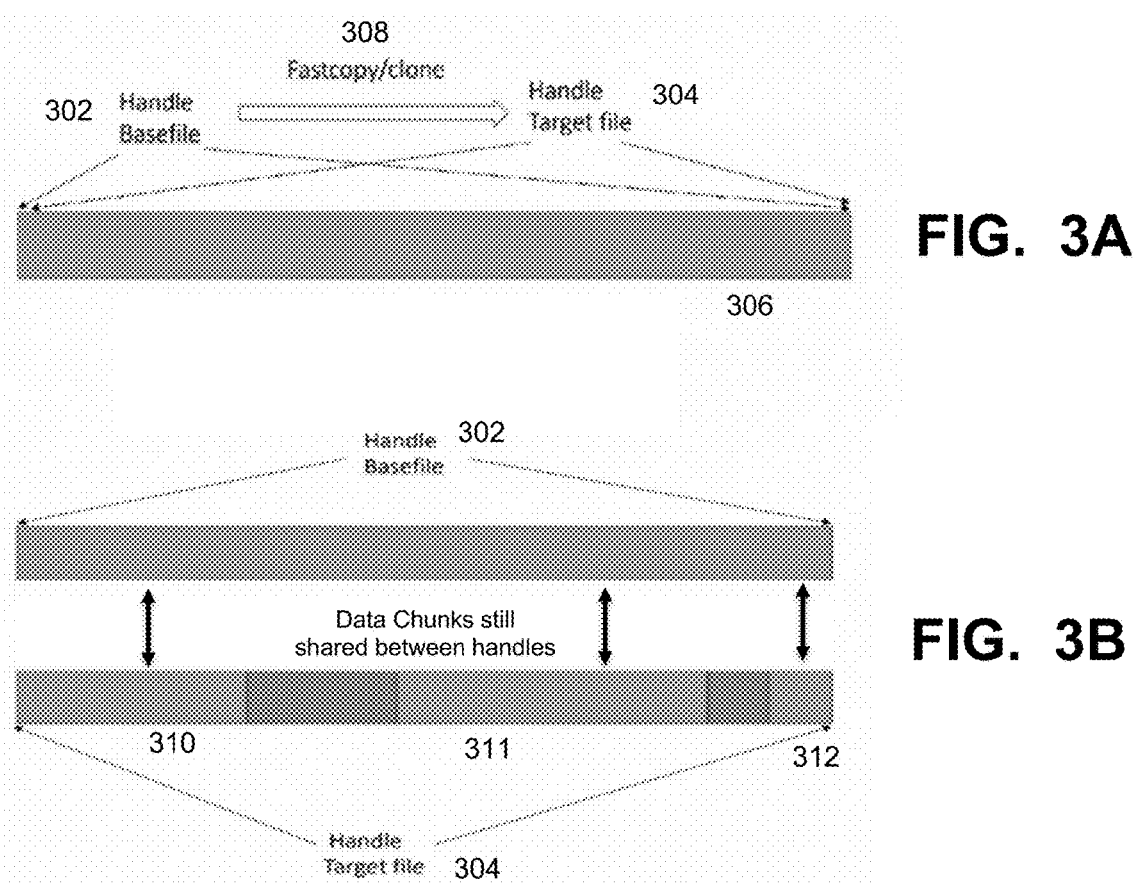
FIG. 3A
FIG. 3B

450

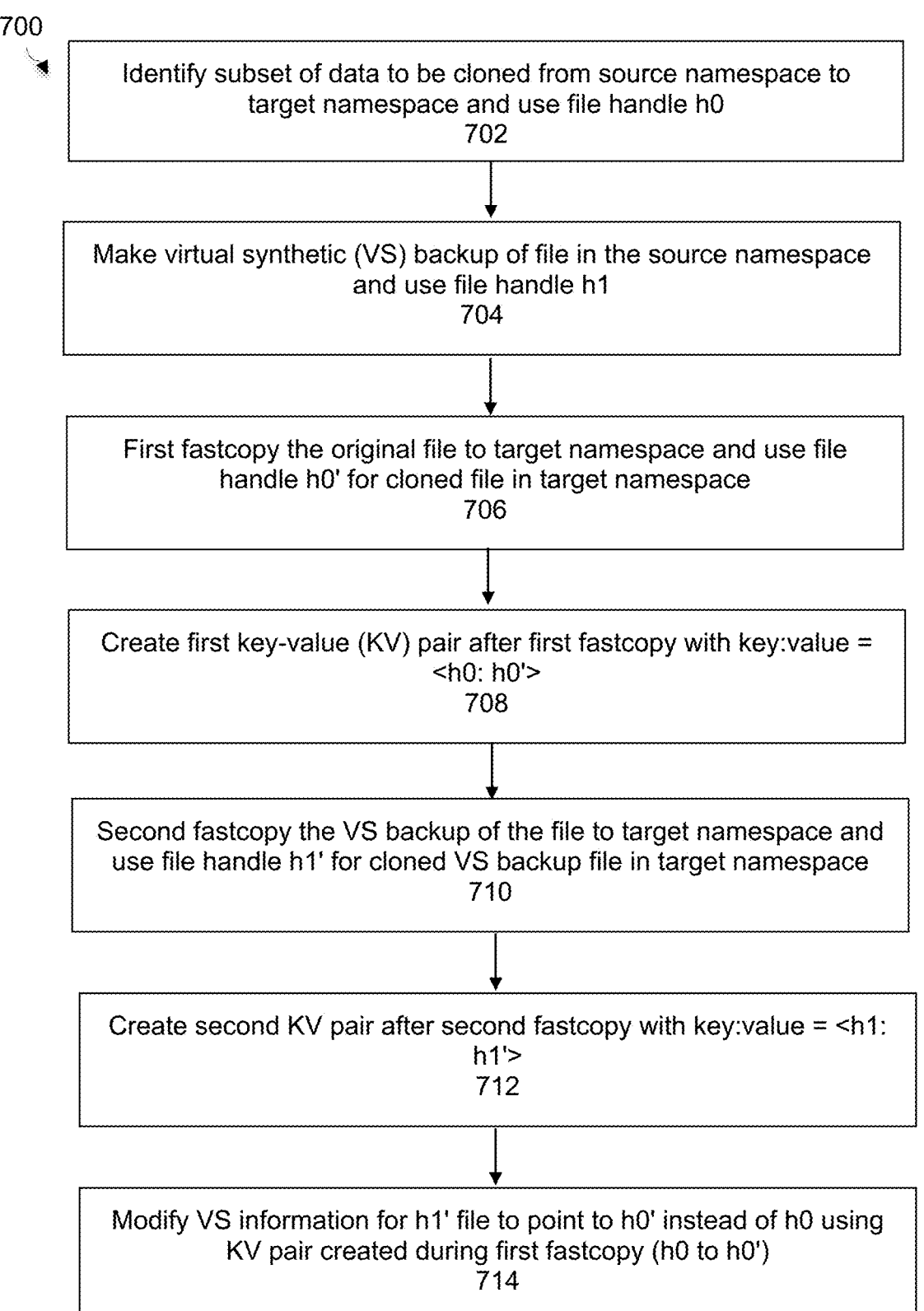

700

Identify subset of data to be cloned from source namespace to target namespace and use file handle h0
702

Make virtual synthetic (VS) backup of file in the source namespace and use file handle h1
704

First fastcopy the original file to target namespace and use file handle h0' for cloned file in target namespace
706

Create first key-value (KV) pair after first fastcopy with key:value = <h0: h0'>
708

Second fastcopy the VS backup of the file to target namespace and use file handle h1' for cloned VS backup file in target namespace
710

Create second KV pair after second fastcopy with key:value = <h1: h1'>
712

Modify VS information for h1' file to point to h0' instead of h0 using KV pair created during first fastcopy (h0 to h0')
714

FIG. 7

MAINTAINING FASTCOPY-OVERWRITE OPTIMIZATION USING KEY-VALUE PAIR FILE HANDLES FOR BACKUPS CLONED ACROSS NAMESPACES

TECHNICAL FIELD

Embodiments relate to deduplication backup systems, and specifically to enhancing data replication performance by preserving fastcopy-overwrite optimization for backups cloned across namespaces.

BACKGROUND OF THE INVENTION

Data deduplication is a form of single-instance storage that eliminates redundant copies of data to reduce storage use. Data compression methods are used to store only unique instances of data by replacing redundant data blocks with pointers to the unique copies. As new data is written, duplicate chunks are replaced with these pointer references to previously stored data. Deduplication systems support various different backup operations such as full, differential, and incremental backups. A synthetic backup is the process of generating a file from a complete copy of a file created in the past and one or more incremental copies created later. In a virtual computing environment, backups may be referred to as virtual synthetic backups of these various backup types.

A file recipe is metadata that is created when a virtual synthetic (VS) backup file is written. The recipe by itself is the relationship of a given file (target file) to a set of prior generations of backup files (base files), and basically holds information about which portions of the given files are same. Another kind of virtual synthetic workload, referred to as the fast copy overwrite (FCOW) workload, uses a copy of the last backup image and then the segments that are changed are overwritten in place (on the copy). The FCOW is done on fixed sized segmentation environments where the segmentation would not have the I/O amplification because of the segmentation. However, the FCOW workload does not create recipes since they do not use a synthetic API.

Most modern backups use virtual synthetic techniques to create synthetic full backups. These (synthetic full) backups have the advantage that they only ingest the changes, and do not need any patching for the restore operations. Modern backup filesystems like the PowerProtect Data Domain also use the virtual synthetic based tracking to enable enhanced replication performance when replicating VS files. This is done by complex tracking of file relationships between generations of the backup files.

In cases where the backup namespace is sub-copied into other namespace (i.e., a subcopy namespace), these relationships are not always preserved, and the filesystem is not able leverage the replication enhancements upon further replication of the files from the subcopy namespace. This can lead to increased times required for replication and potential problems in meeting replication service level agreements (SLAs).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost trademarks of Dell Technologies, Inc.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

FIG. 2 illustrates the composition of a virtual synthetic backup file, under some embodiments.

FIG. 3A illustrates how both the basefile handle and target file handle point to the same content after a fastcopy operation.

FIG. 3B illustrates how certain data is shared between the basefile and target file after the overwrite step for a fastcopy-overwrite operation.

FIG. 7 is a flowchart that illustrates a method of using key-value pairs as file handles to preserve fastcopy-overwrite optimization for backups cloned across namespaces, under some embodiments.

DETAILED DESCRIPTION

Figure 1:
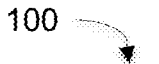
FIG. 1 is a diagram of a computing network implementing a method for enhancing data replication performance by preserving fastcopy-overwrite optimization for backups cloned across namespace subdivisions, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method for enhancing data replication performance by preserving fastcopy-over-write optimization for backups cloned across namespace subdivisions. FIG. 1 illustrates a computer network system that implements one or more embodiments of a data processing and storage network system implementing such a process, under some embodiments.

In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by Dell Technologies, Inc. However, other similar backup and storage systems are also possible.

The Data Domain File System (DDFS) from Dell is an example deduplication filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers. The system can efficiently copy an existing file using an underlying Merkle tree. It creates the new file with a new name, and therefore a new L6 root of the tree, but that tree then references the identical LP chunks. As this operation involves only the root of the tree, it is trivially fast and does not increase physical space in use beyond the one chunk containing the L6.

Backup system 100 can implement various different backup operations, such as full backups that copy all the data from a source to a backup storage data, differential backups that backup all data that has changed from a last full backup, and incremental backups that backup only the data that has changed since a previous backup. In a virtualized environment using a hypervisor (e.g., VMware), these backups may be implemented using virtual storage and virtual full or virtual incremental backups. In addition, backups may be synthesized or implemented as synthetic backups, which involve generating a file from a complete copy of the file created in a full backup and one or more incremental copies created later.

As shown in FIG. 1, system 100, such as implementing the Data Domain Operating System (DDOS) implements a 'fastcopy' functionality 111 that can be used to clone files on a Data Domain Restorer (DDR) to an alternate location within the local instance of the Data Domain File System (DDFS). This process works by creating a brand new file or set of files at the location given as the destination, and cloning the metadata of existing files at the location given as the source to the new files at the destination. This results in data replication that is extremely fast as the operation only involves manipulation of file metadata and no physical backup data is read/written to disk, rather than using an external client to read source files/write destination files. Files created by fastcopy will also deduplicate perfectly against existing data on disk as they will reference the exact same physical data as source files. When fastcopying directory trees, if the destination directory already exists the destination's current content will be removed and replaced by the results of the fastcopy command. In addition if fastcopying a single file and the destination file already exists the destination file will be removed and replaced by the result of the fastcopy command.

In an embodiment, the fastcopy process is used with a virtual synthetic (VS) backup process of 112. VS is a backup method where the incremental backup file is stitched on top the last full backup file so that the new backup file includes the portion of the incremental file and the last full backup. Traditionally, the last full backup file is called the base file, and the incremental file is called the increment. FIG. 2 illustrates the composition of a virtual synthetic backup file, under some embodiments. As shown in diagram 200 of FIG. 2, file 1 comprises a base file 202. The synthesized backup process works by incorporating (stitching in) new content 206 among or between other segments 204, 208 of the base file to generate the synthesized backup file 210.

As stated above, besides recipe-based synthesis, VS based synthesis can be done by making a fastcopy 111 of the previous backup into a new file and then overwriting the changed blocks onto the fastcopied file. Embodiments are directed to methods to preserve relationships when the backup namespace is sub-copied into the subcopy namespace so that the filesystem can leverage the replication enhancements upon further replication of the files from the subcopy namespace and prevent any increase time needed for replication.

In general, the subcopy functionality is increasingly used in the backup and replication applications. There are use cases that demand replication action on only a subset of assets. For example, an administrator may want to protect only a subset of critical VMs (virtual machines) to a remote DR site, or the administrator may want to replicate backup of some assets to a first DR site and those of other assets to a second DR site. Embodiments extend the preservation of synthetic optimization for fastcopy overwrite based synthesis of backups and its replication for these and other similar cases.

In traditional filesystems, a copy operation can be very expensive, but in a modern deduplication filesystem (e.g., Data Domain), the copy operation is achieved by copying the top reference into another inode through a fastcopy (or clone) process (e.g., 111) that creates a new file on which the new blocks are overwritten. This is referred to as a fastcopy-overwrite operation. Since the clone operation copies just the top reference, the data chunks that do not change as part of the overwrite operation remain intact and are shared between the source and the target files, thus leveraging the advantages of a deduplication filesystem.

In a fastcopy process, a relationship between the base file to the synthesized file is established between the previous generation backup and the current backup. That is, the previous generation is marked as a basefile of the synthesized file (next generation backup). This basefile-to-synthesized file relationship constitutes part of an optimization that is later used when replicating the backups to a remote site.

FIG. 3A illustrates how both the basefile handle and target file handle point to the same content after a fastcopy operation. As shown in FIG. 3A, the handle of the basefile 302 is identical to the handle of the target file 304 in that they both span the same amount of content data 306 after the fastcopy operation 308.

FIG. 3B illustrates how certain data is shared between the basefile and target file after the overwrite step for a fastcopy-overwrite operation. As shown in FIG. 3B, data chunks 310, 311, and 312 are shared between the handles 302 and 304 for the basefile and target file, respectively.

With respect to how the synthesis is done on the destination site, synthesis using fastcopy methods differs from recipe-based methods. For replication using fastcopy-overwrite optimization, the file analogous to the source basefile on the destination is fastcopied (cloned) to create the synthesized file (next generation backup) on the destination. On the source side, the original basefile and synthesized file are then compared to find the chunks modified in the target file. These chunks are then patched on to the target file on the destination.

Because of the optimization provided by the basefile-to-synthesized file relationship, the replication performance is much superior to what it would be if files were sent in their entirety or even if the common segments vis-à-vis the previous backups were deduplicated.

As stated above, there are certain cases where replication is performed only on a subset of assets, such as protecting only a subset of critical VMs to a remote disaster recovery (DR) site, replicating a backup of some assets to one DR site and others to another DR site, or other similar use cases. In these cases, a different namespace in addition to a landing namespace may be used. Embodiments are directed to providing enhanced replication performance by preserving the fastcopy-overwrite optimization for backups cloned across namespace subdivisions on a deduplication filesystem, or for any general case where different subsets of data are cloned to different storage targets.

Figure 4A:
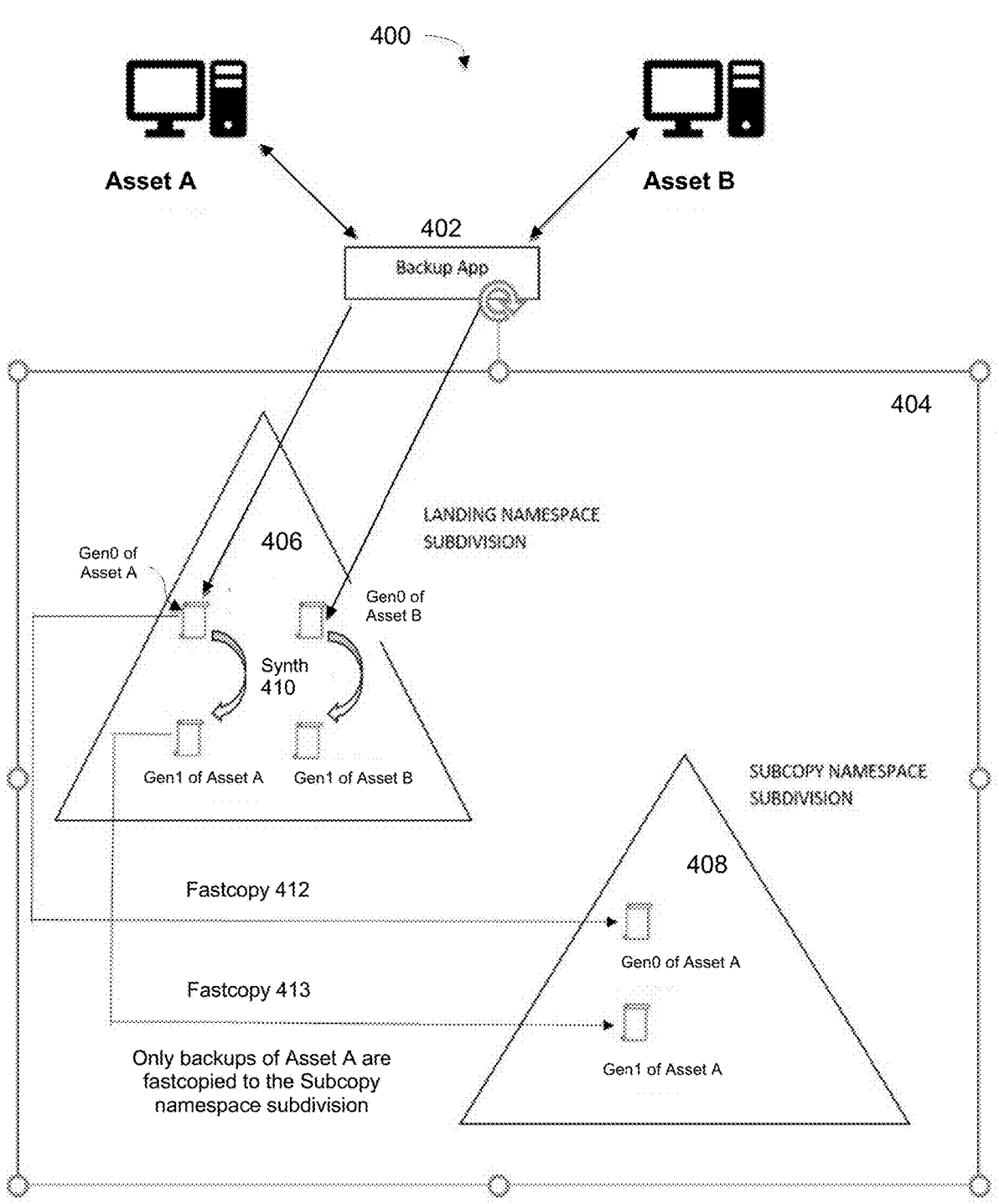
FIG. 4A is a diagrammatic representation illustrating how a subset of datasets are copied to a different namespace subdivision, under some embodiments.

FIG. 4A is a diagrammatic representation 400 illustrating how a subset of datasets are copied to a different namespace subdivision, under some embodiments. As shown in FIG. 4A, asset A and asset B are backed up to backup storage 404 using backup application 402. The filesystem of the backup storage 404 defines a landing namespace subdivision and a separate subcopy namespace subdivision. The first copies of the backed up Assets, denoted Gen0 of Asset A and Gen0 of Asset B are stored in the landing namespace subdivision 406. A synthesized backup ("synthesis") operation creates Gen1 backups of Assets A and B, respectively, as shown.

For the example of FIG. 4A, respective fastcopy operations are performed for the Gen0 and Gen1 copies of Asset A only. As shown, fastcopy operation 412 is performed on the Gen0 backup copy to create Gen0 stored in the subcopy namespace subdivision 408, and fastcopy operation 413 is performed on the Gen1 backup copy to create Gen1 synthesized backup of Asset A in subdivision 408. For the example of FIG. 4A, where only the backups of Asset A are fastcopied to the subcopy namespace subdivision 408, but embodiments are not so limited and additional or other data asset backup files may also be fastcopied/cloned to different namespaces or namespace subdivisions.

It should be noted that embodiments are directed to the cloning of data subsets from a source namespace (e.g., landing namespace subdivision) to a target namespace (e.g., subcopy namespace division). Such a subset of data may comprise a file, a subset of files within a directory, a subset of drives within an array, and so on. A file may be of any appropriate size, and may be organized into a subdirectory or subtree within a directory tree, a subdivision within a namespace, or any other set or partial dataset organized within the filesystem. Unless otherwise noted, the terms namespace 'subset' and namespace subdivision are used interchangeably.

For the example situation of FIG. 4A, where a subset of data in the landing namespace subdivision is simply sub-copied into the subcopy namespace subdivision 408, the basefile-to-synthesized file or basefile-to-target file relationships described above, are not preserved, and the filesystem is not able leverage the replication synthesis optimization.

Such use cases often are served by cloning (fastcopying) the backups of the identified assets to another subset (or subdivision) of the namespace (e.g., the subcopy namespace subdivision 408) and replicating the entire subcopy namespace subdivision to the remote site. A disadvantage of such cloning is that the basefile to target file relationship of the original file is transferred to the new cloned files in the subcopy namespace subdivision. This means that the synthesized file in the clone subset (e.g., Gen1 of Asset A) is still pointing to the basefile in the original namespace subdivision as its own basefile. This prevents the synthetic replication optimization from taking affect if the subcopy namespace subdivision is replicated to another DR site. This situation is further explained immediately below.

Figure 4B:
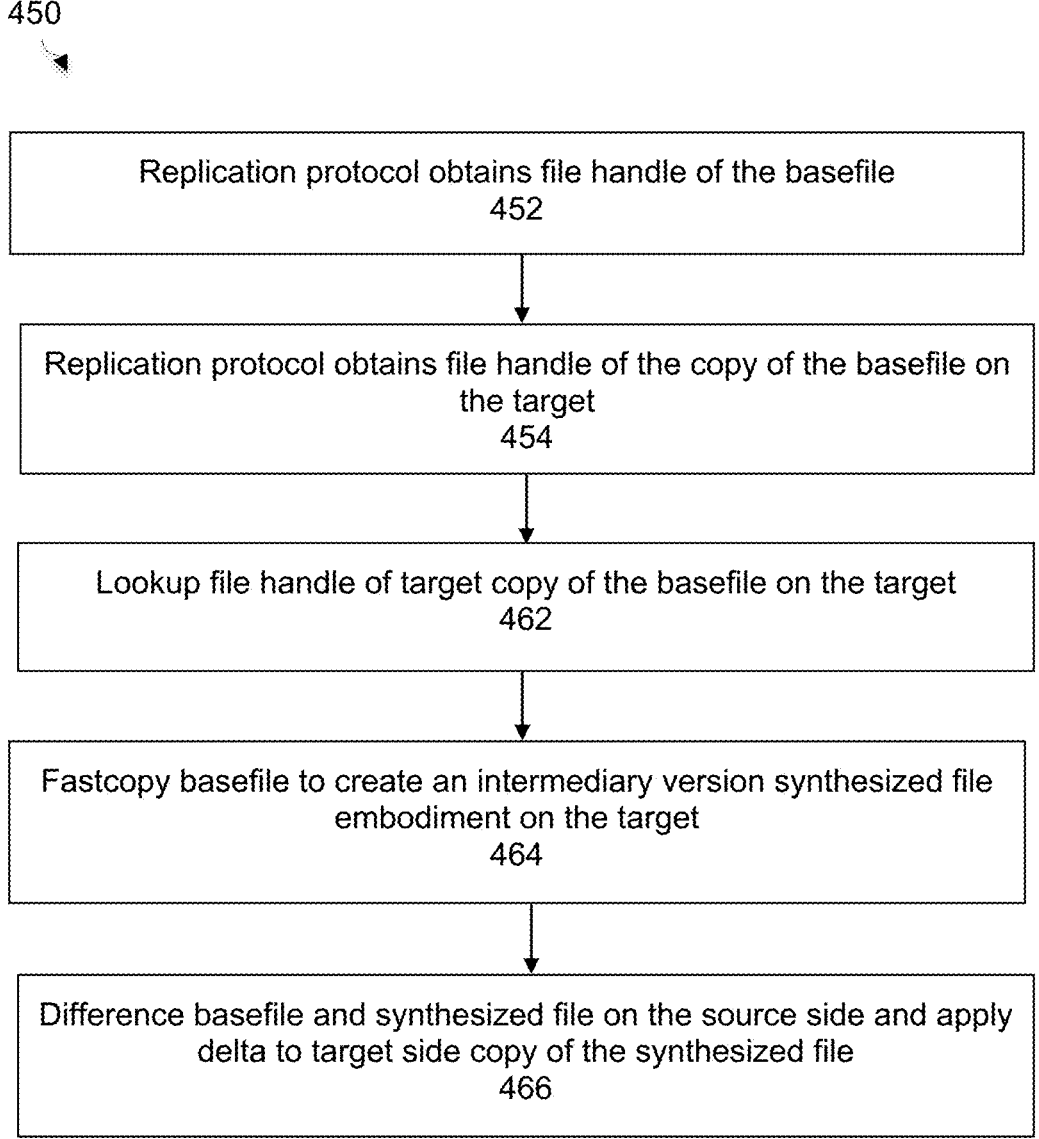
FIG. 4B is a flowchart that illustrates a method of applying fastcopy-overwrite optimization while replicating a synthesized file, under some embodiments.

FIG. 4B is a flowchart that illustrates a method of applying fastcopy-overwrite optimization while replicating a synthesized file, under some embodiments. As shown in FIG. 4B, process 450 starts with the replication protocol obtaining the file handle of the basefile, 452. This is generally maintained as an attribute on the synthesized file handle which is created when the synthesized file is originally backed up. The basefile is the previous generation backup of the same asset (VM, disk, directory, etc.).

The protocol also needs and obtains the handle of the copy or embodiment of the basefile on the target system, 454. This information is exchanged from the target system when the basefile was replicated during the previous replication cycle. This information is stored as a key-value pair on the source system either in memory or somewhere persistently on disk. The key-value pair is expressed in the form of <h0:h0'>, where h0 is the handle of the basefile on the source, and h0' is handle of the embodiment of the basefile on the target. This is simply an example, and any other appropriate label for the key-value pair may be used instead.

When the synthesized file is to be replicated, the file handle of the target embodiment of the basefile is looked up on the target, 462. The target embodiment of the basefile is then fastcopied to create an intermediary version synthesized file embodiment on the target, 464.

The basefile and the synthesized files are differenced on the source side and the delta is applied on the target side embodiment of the synthesized file, 466.

As can be seen in FIG. 4B, there is a dependency on the basefile being replicated and being present on the target, and unless the basefile is not replicated to the target, the fastcopy-overwrite optimization cannot be applied. This would require that the file be sent in its entirety, which would take significantly longer than if the file were recreated on the target using this optimization.

With respect to the subcopy workflow, a subcopy is made by cloning (fastcopying) the backups of the identified assets to another subset of the namespace (e.g., the subcopy namespace subdivision) and replicating the entire subcopy namespace subdivision to the remote target. The clone operation simply creates a new file handle in the subcopy namespace pointing to the same content as being pointed to by the file handle in the original landing namespace. This also means that the attributes on the file handle in the subcopy namespace subdivision will be the same as those on the handle in the landing namespace subdivision. One such attribute is the basefile information. A disadvantage of this clone is that the basefile information (one of the attributes of a file) of the original file is transferred to the new cloned files in the subcopy namespace subdivision. This means that the embodiment of the synthesized file in the subcopy namespace is still pointing to the files in the original landing namespace subdivision as its own basefile.

When such a file in the subcopy namespace is replicated to a different appliance applying the fastcopy-overwrite optimization, the basefile (which is being referred to by the file handle in the subcopy namespace) needs to have been replicated to the target in order for the replication protocol to apply the optimization illustrated in FIG. 4B. However, in this case, the basefile handle is referring to the file present in the original landing namespace subdivision, whereas the files which are being replicated are those which are in the subcopy namespace subdivision, so it is not possible to apply the fastcopy-overwrite optimization since the basefile being referred to by the handle is never replicated to the remote appliance. Unless, the basefile file handles on the files in the subcopy namespace subdivision are not fixed to reference the embodiment of the basefile file handle in the subcopy namespace, it is not possible to apply the optimization of process 450, which in turn prevents the synthetic replication optimization from working if the subcopy namespace subdivision is replicated to another target site.

Figure 5:
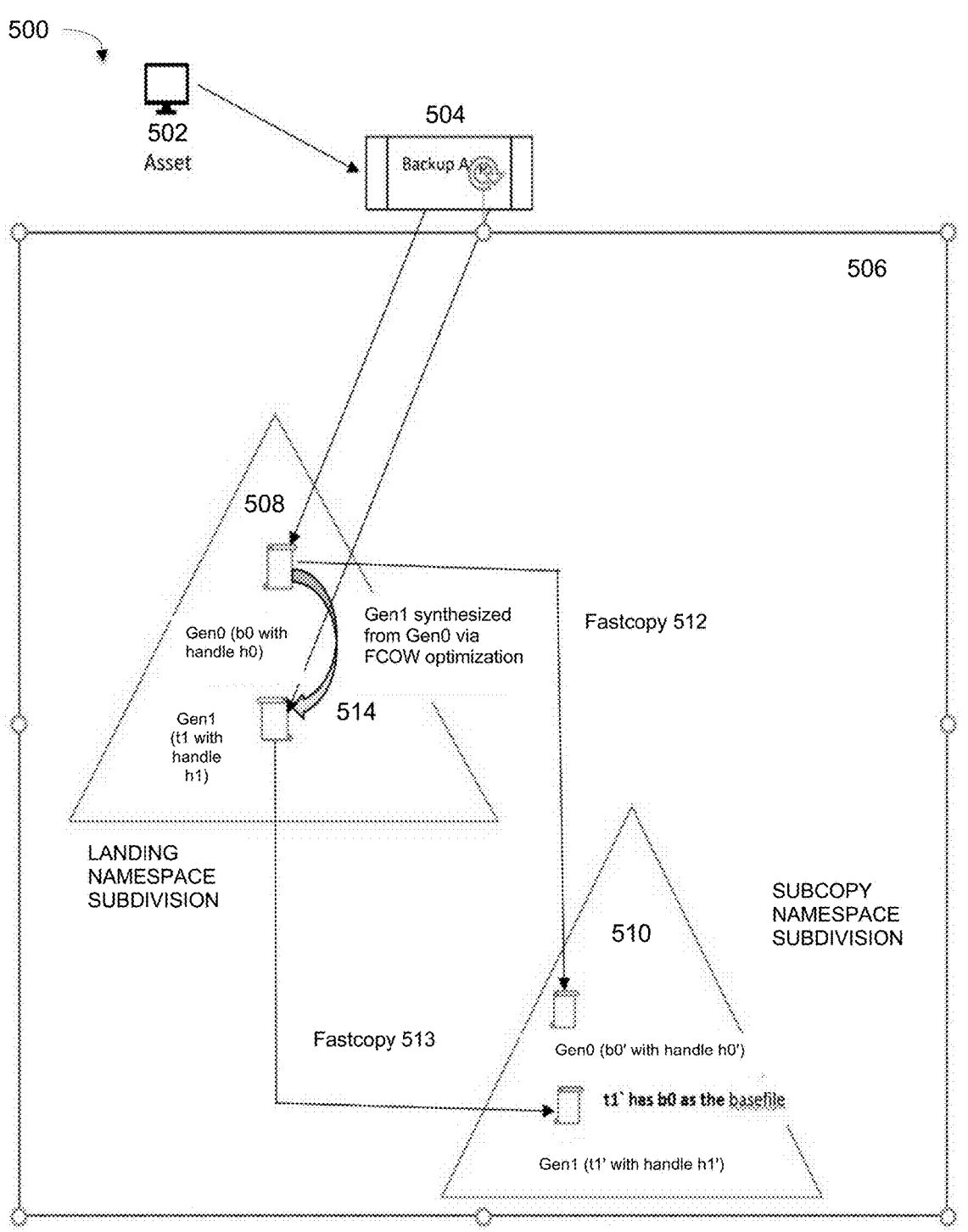
FIG. 5 is a diagrammatic representation illustrating how synthetic replication optimization is prevented by simply cloning backups to a different namespace, under some embodiments.

FIG. 5 is a diagrammatic representation 500 illustrating how synthetic replication optimization is prevented by simply cloning backups to a different namespace, under some embodiments. A subset of datasets are copied to a different namespace subdivision, under some embodiments. As shown in FIG. 5, an Asset 502 is backed up to backup storage 506 by backup application 504. The first backup, Gen0, is stored in the landing namespace subdivision 508. For this example, this comprises a file b0 with handle h0. A synthesis operation creates synthetic backup Gen1, which comprises file t1 with handle h1. The Gen1 copy is synthesized from the Gen0 backup through a fastcopy-overwrite optimization operation 514.

In diagram 500, a fastcopy operation 512 copies the Gen0 backup file to the subcopy namespace subdivision 510. For this example, the fastcopied Gen0 comprises file b0' with handle h0'. Another fastcopy operation 513 copes the Gen1 backup file to subdivision 510 also. For this example, the fastcopied Gen1 file comprises file t1' with handle h1', where t1' has b0 as the basefile.

Table 1 below shows the base file relationship on the landing namespace subdivision 510 for the example of FIG. 5.

TABLE 1

| Generation of Backup | Filename | Basefile |
|---|---|---|
| Gen0 | b0 | None |
| Gen1 | t1 | b0 |

Similarly, the relationships of the files in the subcopy namespace subdivision 510 are shown in Table 2 below:

TABLE 2

| Generation of Backup | Filename | Basefile |
|---|---|---|
| Gen0 | b0' | None |
| Gen1 | t1' | b0 |

As shown in diagram 500, file t1 in the landing namespace subdivision 508 is synthesized from file b0 through the fastcopy-overwrite mechanism 51, and file b0 is fastcopied as b0' into the subcopy namespace subdivision 510 followed by file t1 as t1'.

After the subcopy operation file t1' is still referring to file b0 as its basefile (as shown in the tables above), since the relationship of file t1 (having b0 as it's basefile) is applied to the file t1' in the fastcopy step. However, the actual embodiment of file of b0 in the subcopy namespace subdivision 510 is b0'. Unless this relationship is fixed on t1', any replication of t1' to another directory tree will not get benefit of the fastcopy-overwrite based synthesis as the basefile b0 will never be replicated as a part of the replication of the subcopy namespace.

Without the benefit of fastcopy-overwrite optimization, the file will need to be sent in its entirety through over the wire deduplication, which involves sending the hashes of data chunks of the file and then receiving the hashes back from the target for which the target does not have data chunks present, and then sending segments for the hashes received from the target. The other way is to send all the file data without the over the wire deduplication. Both of these approaches are suboptimal and will cause waste of CPU cycles as well as network bandwidth, which would eventually result in significantly higher replication time for a given synthesized backup.

In general, all filesystems have a unique identifier associated with a file, referred to as the "file handle." A typical file handle is of a relatively small length metadata element (e.g., 32 bytes) that always refers to the same file object even if it is renamed. If a pathname for the file is reused for another object, a reference to the file handle will fail. A file handle comprises the file system storing the file and its file identifier within the file system. The file identifiers are persistent and never reused. A file handle thus remains same even if the file is renamed. In filesystem such as DDFS, the basefile-synthesized file relationship is maintained via file handles and not file paths so that these relationships are not altered by file renames operations, and so on.

Embodiments preserve the synthetic optimization for fastcopy-overwrite backups when cloned to a new namespace or namespace subdivision upon subsequent replication and thus eliminates the issue illustrated in FIG. 5. In an embodiment, process 120 provides enhanced data replication performance by keeping a key value (KV) pair for each of the files that are being cloned from the original namespace subdivision to the new subcopy namespace subdivision. In an embodiment, the key (K) comprises the file handle of the file being cloned in the original namespace subdivision, and the value (V) comprises the file handle of the cloned file in the subcopy namespace subdivision. Thus, with reference to FIG. 5, for file b0, h0 is the file handle which constitutes the key, and for file b0', h0' is the file handle which constitutes the value.

When a subsequent generation backup of the same asset (e.g., file t1 with handle h1) is cloned through fastcopy operation 512, the basefile target file (h0 being the basefile of h1) relationship is transferred verbatim to the new file which has handle h1' (file t1') in the subcopy namespace subdivision 510, as shown in the example of FIG. 5. If this subcopy namespace subdivision 510 is to be replicated to another site, the fastcopy-overwrite optimization cannot be applied during replication, as a file with handle h0 (in the original landing namepace subdivision 508) was never replicated to the other site. This would lead to significantly lower replication performance than what could be achieved if the optimization was available because entire files would need to be sent instead, in that case.

Embodiments of the KV-based file handle scheme, however, allow the basefile information on the file to be modified to point to a different file handle to overcome this problem of preventing fastcopy-overwrite optimization from being implemented. For the example above, process 120 allows the file with handle h1' to be modified to point to file with handle h0' so that fastcopy-overwrite optimization could be applied as the file with handle h0' would have been replicated to the destination as a part of continuous replication, and could then be used to synthesize the copy or embodiment of the file with handle h1' (t1' being the name/path) on the destination.

In an embodiment, this is accomplished by fastcopying h0's embodiment on the destination (denoted as h0''), finding the delta between h1' and h0' on the source (subcopy namespace subdivision), and applying the delta to the file created because of the fastcopy of h0'' on the destination.

In an embodiment, the key-value pairs are created to maintain the relationship basefile to target file relationships to implement the fastcopy-overwrite optimization during cloning across namespaces. When a file with handle h1 is fastcopied/cloned to a file with handle h1', the filesystem can look up the key h0 (basefile for file with handle h1 in the original namespace) which will have the value h0'. This information will then be used to modify the basefile to file relationship on the cloned/fastcopied file with handle h1'.

For file with handle h1' the basefile handle h0 will be replaced with h0' after lookup from the key-value that we are maintaining. After h1 has been cloned another key value pair will be created <h1:h1'> which will be used to rectify the relationship for the next backup which will be taken and cloned.

Figure 6:
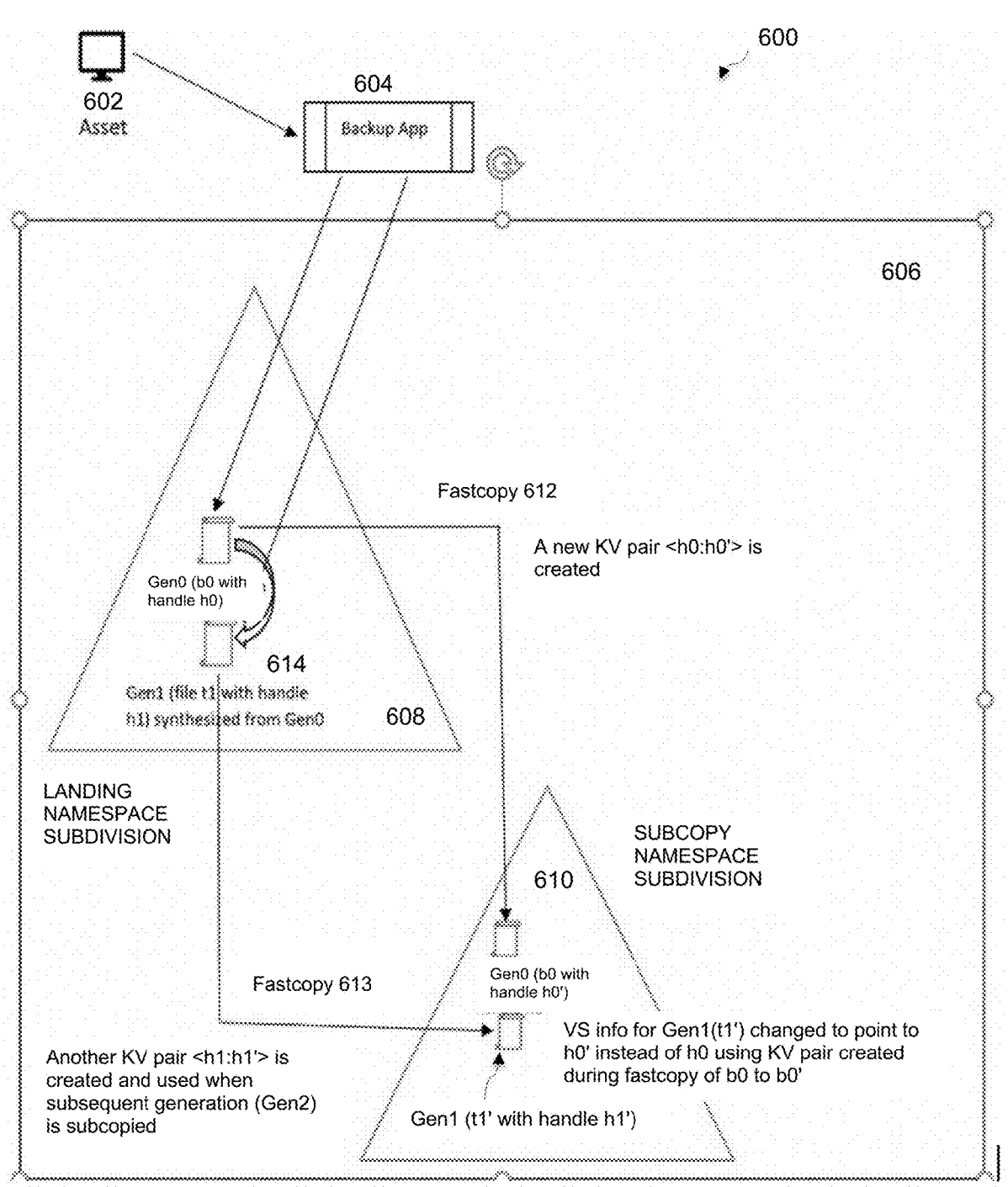
FIG. 6 is a diagrammatic representation illustrating how key-value pairs are used to allow synthetic replication optimization to be implemented when cloning backups to a different namespace, under some embodiments.

FIG. 6 is a diagrammatic representation 600 illustrating how key-value pairs are used to allow synthetic replication optimization to be implemented when cloning backups to a different namespace, under some embodiments.

As shown in FIG. 6, an Asset 602 is backed up to backup storage 606 by backup application 604. The first backup, Gen0, is stored in the landing namespace subdivision 608. For this example, this comprises a file b0 with handle h0. A synthesis operation creates synthetic backup Gen1, which comprises file t1 with handle h1. The Gen1 copy is synthesized from the Gen0 backup through a fastcopy-overwrite optimization operation 614.

In diagram 600, a fastcopy operation 612 copies the Gen0 backup file to the subcopy namespace subdivision 610. For this example, the fastcopied Gen0 comprises file b0' with handle h0'. Another fastcopy operation 613 copes the Gen1 backup file to subdivision 610 also. For this example, the fastcopied Gen1 file comprises file t1' with handle h1', where t1' has b0 as the basefile. For the embodiment of FIG. 6, the fastcopy operation 612 creates a new key-value pair comprising KV=<h0:h0'>, and fast copy operation 613 creates another key-value pair comprising KV=<h1:h1'>, which will be used when a subsequent generation backup (Gen2) is subcopied.

In the subcopy namespace subdivision 610, the virtual synthetic information for the Gen1 (t1') file is modified to point to file handle h0' instead of h0. This is accomplished using the KV pair created during the fastcopy 613 operation of b0 to b0'. In this case, right after the fastcopy step, the Gen1 file (with handle h1') in the subcopy namespace subdivision has in its attributes h0 as the basefile. Since h0 is not being replicated to the target (since its embodiment in the subcopy namespace subdivision which is h0' is the data being replicated), fastcopy-overwrite optimization cannot be applied if this basefile information is used as is, as illustrated in FIG. 4B. However, since the system made a key-value entry when h0 was fastcopied to h0' in the subcopy namespace, the basefile attribute on h1' can be modified by looking up the current basefile (key) that its attribute stores (h0), in the key-value store. The value of this key will be h0'. Now the basefile attribute on this file (h1') can modified to h0'. Since h0' will be replicated to the target as a part of continuous replication the fastcopy-overwrite optimization can be applied as a part of continuous replication. After this information has been modified while replicating h1', fastcopy-overwrite optimization can be used seamlessly as the basefile that is present in the attribute has been replicated to the target as a part of the continuous replication.

The modification of the VS information for the Gen1 (t1') file to point to h0' instead of h0 thus rectifies the basefile to target file relationship after the cloning operation 613 to the new namespace subdivision. Thus preserving the optimization of the fastcopy overwrite operations.

Table 3 below shows the base file relationship on the landing namespace subdivision 610 for the example of FIG. 6. Table 3 lists an example of the handles in the original namespace 608, the clone namespace 610 and the corresponding key-value entries that are created:

TABLE 3

| Generation of Backup | Landing Namespace File handle | Clone Namespace File handle | Key-value pair created after fastcopy |
|---|---|---|---|
| Gen0 | h0 | h0' | h0-h0' |
| Gen1 | h1 | h1' | h1-h1' |

The key-value pairs may reside as an in-memory attribute or may be persisted on disk to avoid any loss of information across system restarts. In an embodiment, the Data Domain filesystem persists this information as an extended attribute of the original source file.

FIG. 7 is a flowchart that illustrates a method of using key-value pairs as file handles to preserve fastcopy-overwrite optimization for backups cloned across namespaces, under some embodiments. The process 700 of FIG. 700 starts with identifying a set or subset (or subdivision) of data to be cloned from a source namespace to a target namespace, 702. This dataset (asset) is identified using a unique file handle, such as h0. It should be noted that for purposes of description, certain naming conventions are used to denote file handle names (e.g., h0, h1, h0', etc.) for purposes of convenience, and any appropriate file handle may be used. Such file handles are used to identify files that may be denoted under a different name, such as b0, t1, and so on, as shown in FIG. 6, but the file handle generally represents the ultimate identifier of a file.

The process 700 makes a VS backup of the file in the source namespace and uses the file handle h1 for the VS copy, 704. It then fastcopies the original file (with file handle h0) to the target namespace and uses the file handle h0' for the cloned file in the target namespace. The process then creates a first KV pair after this fastcopy operation with KV=<h0:h0'>, 708.

Process 700 next fastcopies the VS backup of the file having the file handle h1 to the target namespace, and uses the file handle h1' for this cloned VS backup file, 710. It then creates a second KV pair after this fastcopy operation with KV=<h1:h1'>.

As described previously, the VS information for the h1' file is then modified to point to h0' instead of h0 using the KV pair created during the fastcopy operation that makes h0' from h0. Right after the fastcopy step, the Gen1 file (with handle h1') in the subcopy namespace subdivision has in its attributes, h0 as the basefile. Since the system made a KV entry when h0 was fastcopied to h0' in the subcopy namespace, the basefile attribute on h1' can be modified by looking up the current basefile (key) that its attribute stores (h0) in the key-value store. The value of this key will be h0'. The basefile attribute on this file (h1') can now be modified to h0'. Since h0' will be replicated to the target as a part of continuous replication, the fastcopy-overwrite optimization can be applied as a part of continuous replication.

This modification acts to rectify the basefile to target file relationship after clone replication of fastcopy-overwrite backups to the new namespace subdivision and results in the significant performance boost upon subsequent replication of the subcopy namespace subset as allowed by the fastcopy-overwrite optimization.

Although embodiments have been described with respect to fastcopy cloning methods to copy data from a first namespace to a second namespace, embodiments are not so limited. Other cloning processes can also be used. One such process is a clone-aware replication protocol. This workflow uses replication instead of a fastcopy operation to move files from the original namespace subdivision to the clone namespace subdivision. The protocol internally determines that the source and target namespaces reside on the same appliance and internally makes a clone of the backup. With reference to FIG. 7, process 700 would be modified such that steps 706 and 710 utilize a clone-aware replication process instead of fastcopy to make the clone copies, and the other steps would proceed as presented, for the clone-aware replication embodiment.

Figure 8:
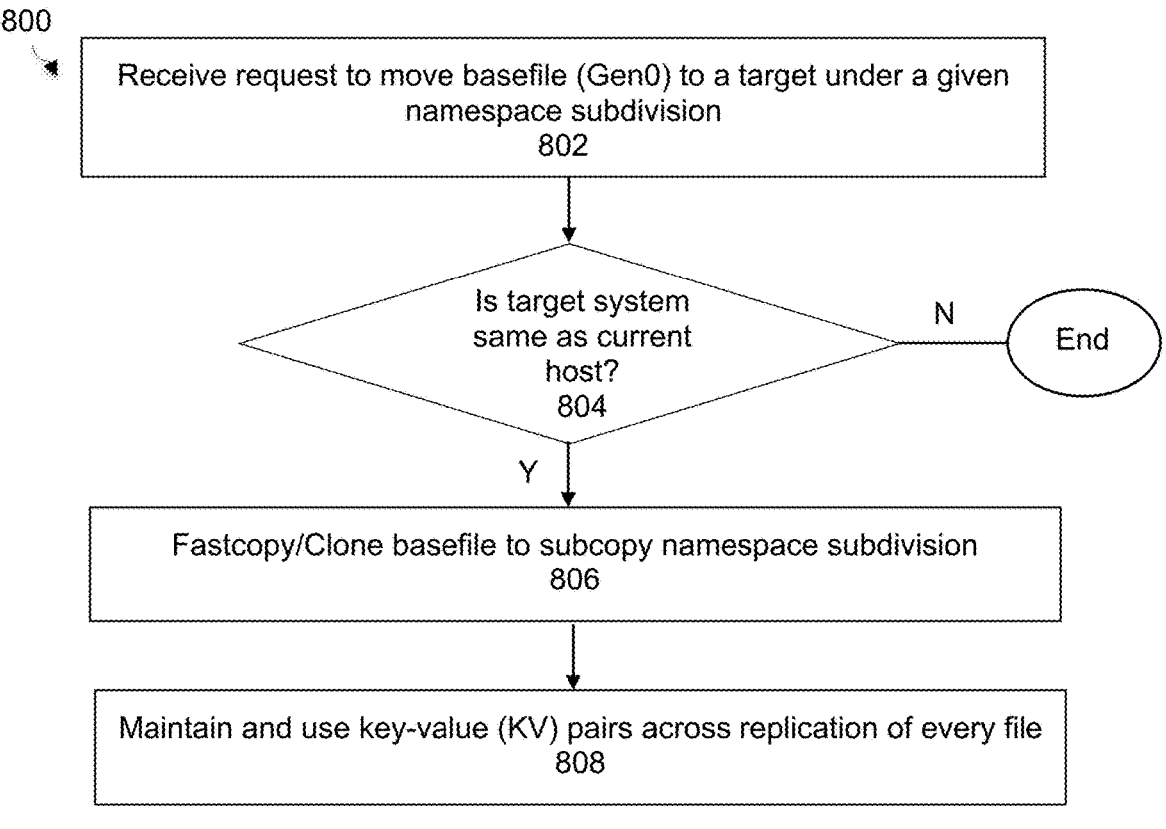
FIG. 8 is a flowchart that illustrates a method of clone-aware replication, under some embodiments.

FIG. 8 is a flowchart 800 that illustrates a method of clone-aware replication, under some embodiments. This protocol generally does the same as the fastcopy-based movement population of files in the subcopy namespace subdivision, as described above, with the primary difference being that previous the protocol comes in via a set of remote procedure calls to move the file from the landing namespace subdivision to the subcopy namespace subdivision.

As shown in FIG. 8, process 800 starts by the replication subsystem receiving a request to move the basefile (Gen0) to a given target system and under a given namespace subdivision on the target system, 802.

In step 804, it is determined whether or not the target system is the same as the current host, and if not, the process ends until another request is received, 802. Otherwise, the protocol simply clones/fastcopies the file to the subcopy namespace subdivision, 806, instead of making over the wire remote procedure calls to move the data. This is effectively the same as saying that no data is sent over the wire. However, it should be noted that such a mechanism of using a clone/fastcopy operation would introduce the same set of problems as the fastcopy workflow illustrated in FIG. 4B. To alleviate those set of problems, the clone replication protocol uses the same set of key-values pairs maintained across replication of every file, as described above, such as in FIG. 7, 808.

Embodiments thus provide for enhanced replication performance by fastcopy-overwrite optimization preservation for backups cloned across namespace subdivisions on a deduplication filesystem by utilizing and appropriately modifying KV pairs to encapsulate file handles for the original, VS copied, and fastcopied files between the source and target namespaces.

Embodiments of the processes and techniques described above can be implemented on any appropriate backup system operating environment or filesystem, or network server system. Such embodiments may include other or alternative data structures or definitions as needed or appropriate.

Figure 9:
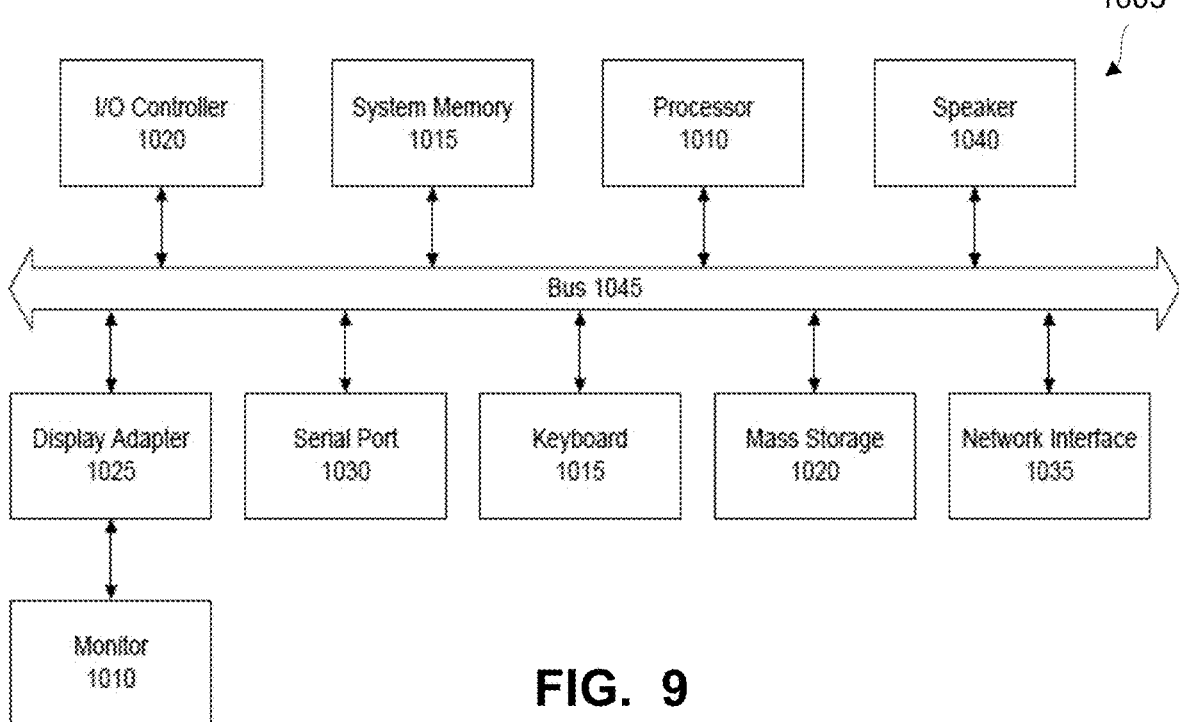
FIG. 9 is a block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (e.g., IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of processing fastcopy overwrite backups between different namespaces, comprising:
  making a virtual synthetic (VS) backup of a file having a first file handle in a source namespace and designating the VS backup with a second file handle;
  first cloning the file to a target namespace and designating the first cloned file with a modified first file handle;
  creating a first key-value (KV) pair with a pair comprising the first file handle and the modified first file handle;
  second cloning the VS backup of the file to the target namespace and designating the second cloned VS backup with a modified second file handle;
  creating a second KV pair with a pair comprising the second file handle and the modified second file handle; and
  modifying VS information for the cloned VS backup to point to the file corresponding to the modified first file handle using the first KV pair.

2. The method of claim 1 wherein the fastcopy overwrite backups are performed using a deduplication backup system.

3. The method of claim 2 wherein the deduplication backup system comprises a data storage server running a Data Domain File System (DDFS).

4. The method of claim 3 wherein the clone operation is one of a fastcopy operation or a clone-aware replication, wherein the fastcopy operation clones files on a data storage location to an alternate location within a local instance of the DDFS.

5. The method of claim 4 wherein the fastcopy operation:
  creates a brand new file or set of files at the target namespace; and
  clones metadata of existing files at the source namespace to new files at the target namespace.

6. The method of claim 5 wherein the fastcopy operation uses a set of remote procedure calls to move the file from the source namespace to the target namespace.

7. The method of claim 4 wherein the clone-aware replication:
  internally determines that the source and target namespaces reside on the same appliance; and
  internally makes a clone of a backup of the fastcopy overwrite backups.

8. The method of claim 4 wherein the file is stored in a Merkle tree structure with content data stored in a bottom level of the tree and indexed by fingerprints.

9. The method of claim 8 wherein the fastcopy operation copies metadata of the base file comprising inode information and a reference to a top segment file in a first Merkle tree to a second directory for the target file, and wherein a second Merkle tree is generated for the target file in which the new data blocks for the overwritten data are inserted over any updated old data blocks of the first Merkle tree.

10. The method of claim 9 wherein the modifying step comprises a rectification of a basefile to target file relationship after clone replication of the fastcopy overwrite backup to the target namespace.

11. The method of claim 10 wherein the rectification allows operation of fastcopy overwrite optimization for the backup.

12. A computer-implemented method of processing fastcopy overwrite backups between different namespaces, comprising:
  cloning a synthetic backup of a first generation file with handle h1 from a source namespace to a target namespace to generate a second generation file with handle h1';
  maintaining, as attributes of the file, a handle h0 as a basefile of the synthetic backup;
  making, upon cloning the file with handle h0 to create file with handle h0' in the target namespace, a key-value (KV) entry in a KV store, wherein h0 is a handle of a basefile on the source namespace, and h0' is a handle of an embodiment of the basefile on the target namespace, and further wherein h1 is a handle of a clone of the basefile on the source namespace, and h1' is handle of an embodiment of the clone of the basefile on the target namespace, as h0 comprises the basefile of h1; and
  modifying the attributes to change a current basefile from h1' to h0' using the KV entry allowing a file with handle h0' to be replicated to the target namespace, thus facilitating use of fastcopy-overwrite optimization during continuous replication of the file.

13. The method of claim 12 wherein the modifying comprises looking up the current basefile that its attribute stores in the key-value store.

14. The method of claim 12 wherein the fastcopy overwrite backups are performed using a deduplication backup system, and further wherein the deduplication backup system comprises a data storage server running a Data Domain File System (DDFS).

15. The method of claim 14 wherein the clone operation is one of a fastcopy operation or a clone-aware replication, wherein the fastcopy operation clones files on a data storage location to an alternate location within a local instance of the DDFS.

16. The method of claim 15 wherein the fastcopy operation:

creates a brand new file or set of files at the target namespace; and clones metadata of existing files at the source namespace to new files at the target namespace, and further wherein the fastcopy operation uses a set of remote procedure calls to move the file from the source namespace to the target namespace.

17. The method of claim 14 wherein the clone-aware replication:

internally determines that the source and target namespaces reside on the same appliance; and internally makes a clone of the synthetic backup.

18. A tangible, non-transitory, product having stored thereon programming code configured to perform, when executed by a processor-based computer, a method of processing fastcopy overwrite backups between different namespaces, by:

making a virtual synthetic (VS) backup of a file having a first file handle in a source namespace and designating the VS backup with a second file handle;

first cloning the file to a target namespace and designating the first cloned file with a modified first file handle;

creating a first key-value (KV) pair with a pair comprising the first file handle and the modified first file handle;

second cloning the VS backup of the file to the target namespace and designating the second cloned VS backup with a modified second file handle;

creating a second KV pair with a pair comprising the second file handle and the modified second file handle; and modifying VS information for the cloned VS backup to point to the file corresponding to the modified first file handle using the first KV pair.

19. The product of claim 18 wherein the fastcopy overwrite backups are performed using a deduplication backup system, and further wherein the deduplication backup system comprises a data storage server running a Data Domain File System (DDFS).

20. The product of claim 19 wherein the clone operation is one of a fastcopy operation or a clone-aware replication, wherein the fastcopy operation clones files on a data storage location to an alternate location within a local instance of the DDFS.

* * * * *